(12) United States Patent
Barker et al.

(10) Patent No.: US 6,855,462 B2
(45) Date of Patent: Feb. 15, 2005

(54) LITHIUM METAL FLUOROPHOSPHATE MATERIALS AND PREPARATION THEREOF

(75) Inventors: Jeremy Barker, Shipton-Under-Wychwood (GB); M. Yazid Saidi, Henderson, NV (US); Jeffrey Swoyer, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 238 days.

(21) Appl. No.: 10/133,091

(22) Filed: Apr. 26, 2002

(65) Prior Publication Data

US 2002/0168573 A1 Nov. 14, 2002

Related U.S. Application Data

(63) Continuation of application No. 09/559,861, filed on Apr. 27, 2000, now Pat. No. 6,387,568.

(51) Int. Cl.[7] .......................... H01M 4/58; C01B 25/00; C01B 25/10
(52) U.S. Cl. .................. 429/231.1; 429/231.2; 429/231.3; 423/312
(58) Field of Search .................. 429/231.1, 218.1, 429/231.2, 231.3; 423/306, 312

(56) References Cited

U.S. PATENT DOCUMENTS

| | | | |
|---|---|---|---|
| 3,736,184 A | | 5/1973 | Dey et al. |
| 4,009,092 A | | 2/1977 | Taylor |
| 4,049,891 A | | 9/1977 | Hong et al. |
| 4,098,687 A | * | 7/1978 | Yang .................. 209/166 |
| 4,194,062 A | | 3/1980 | Carides et al. |
| 4,260,668 A | | 4/1981 | Lecerf et al. |
| 4,434,216 A | | 2/1984 | Joshi et al. |

(List continued on next page.)

FOREIGN PATENT DOCUMENTS

| | | | |
|---|---|---|---|
| EP | 0 680 106 A1 | 11/1995 | |
| EP | 0 849 817 | 6/1998 | |
| EP | 1049182 | 11/2000 | ............ H01M/4/58 |
| EP | 1 093 172 | 4/2001 | |
| JP | 61 263069 | 11/1986 | |
| JP | 6-251764 | 9/1994 | |
| JP | 09 171827 | 6/1997 | |
| JP | 2001 52733 | 2/2001 | |
| JP | 2001 85010 | 3/2001 | |
| WO | WO 98/12761 | 3/1998 | |
| WO | WO 9930378 | 6/1999 | |
| WO | WO 00/01024 | 1/2000 | |
| WO | WO 00/31812 | 6/2000 | |
| WO | WO 0057505 | 9/2000 | |
| WO | WO 01/13443 | 2/2001 | |
| WO | WO 01/53198 | 7/2001 | |
| WO | WO 01/54212 | 7/2001 | |
| WO | WO 01/84655 | 11/2001 | |

OTHER PUBLICATIONS

Genkina et al. "Crystal structure of synthetic tavorite . . . " Kristallografiya (1984) 29 (1) 50–5 (Abstract only).*

Genkina et al., "Phase formation and crystallochemistry of iron phosphates . . . ", Izv. Akad. Nauk SSR, Neorg. Mater. (1988), 24 (7), 1158–62 abstract only.*

(List continued on next page.)

*Primary Examiner*—Carol Chaney
(74) *Attorney, Agent, or Firm*—Michael D. Ross; Roger A. Williams; Cynthia S. Kovacevic

(57) ABSTRACT

The invention provides new and novel lithium-metal-fluorophosphates which, upon electrochemical interaction, release lithium ions, and are capable of reversibly cycling lithium ions. The invention provides a rechargeable lithium battery which comprises an electrode formed from the novel lithium-metal-fluorophosphates. The lithium-metal-fluorophosphates comprise lithium and at least one other metal besides lithium.

17 Claims, 8 Drawing Sheets

U.S. PATENT DOCUMENTS

| | | | |
|---|---|---|---|
| 4,464,447 A | 8/1984 | Lazzari et al. | |
| 4,477,541 A | 10/1984 | Fraioli | |
| 4,512,905 A | 4/1985 | Clearfield et al. | |
| 4,668,595 A | 5/1987 | Yoshino et al. | |
| 4,683,181 A | 7/1987 | Armand et al. | |
| 4,690,877 A | 9/1987 | Gabano et al. | |
| 4,707,422 A | 11/1987 | deNeufville et al. | |
| 4,792,504 A | 12/1988 | Schwab et al. | |
| 4,803,137 A | 2/1989 | Miyazaki et al. | |
| 4,830,939 A | 5/1989 | Lee et al. | |
| 4,925,752 A | 5/1990 | Fauteux et al. | |
| 4,935,317 A | 6/1990 | Fauteux et al. | |
| 4,985,317 A | 1/1991 | Adachi et al. | |
| 4,990,413 A | 2/1991 | Lee et al. | |
| 5,011,501 A | 4/1991 | Shackle et al. | |
| 5,028,500 A | 7/1991 | Fong et al. | |
| 5,037,712 A | 8/1991 | Shackle et al. | |
| 5,130,211 A | 7/1992 | Wilkinson et al. | |
| 5,232,794 A | 8/1993 | Krumpelt et al. | |
| 5,262,253 A | 11/1993 | Golovin | |
| 5,262,548 A | 11/1993 | Barone | |
| 5,296,436 A | 3/1994 | Bortinger | |
| 5,300,373 A | 4/1994 | Shackle | |
| 5,326,653 A | 7/1994 | Chang | |
| 5,399,447 A | 3/1995 | Chaloner-Gill et al. | |
| 5,411,820 A | 5/1995 | Chaloner-Gill | |
| 5,418,090 A | 5/1995 | Koksbang et al. | |
| 5,418,091 A | 5/1995 | Gozdz et al. | |
| 5,435,054 A | 7/1995 | Tonder et al. | |
| 5,456,000 A | 10/1995 | Gozdz et al. | |
| 5,460,904 A | 10/1995 | Gozdz et al. | |
| 5,463,179 A | 10/1995 | Chaloner-Gill et al. | |
| 5,482,795 A | 1/1996 | Chaloner-Gill | |
| 5,508,130 A | 4/1996 | Golovin | |
| 5,514,490 A | 5/1996 | Chen et al. | |
| 5,538,814 A | 7/1996 | Kamauchi et al. | |
| 5,540,741 A | 7/1996 | Gozdz et al. | |
| 5,541,020 A | 7/1996 | Golovin et al. | |
| 5,620,810 A | 4/1997 | Golovin et al. | |
| 5,643,695 A | 7/1997 | Barker et al. | |
| 5,660,948 A | 8/1997 | Barker | |
| 5,695,893 A | 12/1997 | Arai et al. | |
| 5,700,298 A | 12/1997 | Shi et al. | |
| 5,712,059 A | 1/1998 | Barker et al. | |
| 5,804,335 A | 9/1998 | Kamauchi et al. | |
| 5,830,602 A | 11/1998 | Barker et al. | |
| 5,851,504 A | 12/1998 | Barker et al. | |
| 5,869,207 A | 2/1999 | Saidi et al. | |
| 5,871,866 A | 2/1999 | Barker et al. | |
| 5,910,382 A | 6/1999 | Goodenough et al. | |
| 6,004,697 A | 12/1999 | Thackeray et al. | |
| 6,020,087 A | 2/2000 | Gao | |
| 6,103,419 A | 8/2000 | Saidi et al. | |
| 6,136,472 A | 10/2000 | Barker et al. | |
| 6,153,333 A | 11/2000 | Barker | |
| 6,183,718 B1 | 2/2001 | Barker et al. | |
| 6,306,215 B1 | 10/2001 | Larkin | |
| 6,387,568 B1 * | 5/2002 | Barker et al. | 429/218.1 |

OTHER PUBLICATIONS

Andersson, A., et al., Thermal stability of LiFePO4—based cathodes, (2000), Electrochemical and Solid–State Letters, 3(2), pp. 66–68.

Amine, K., et al., Olivine LiCoPO4 as 4.8 V Electrode Material for Lithium Batteries, (2000), Electrochemical and Solid–State Letters, 3(4), pp. 178–179.

Kirkby, et al., Crystal Structure of Potassium Aluminum Fluoride Phosphate KA1FPO4), Zeitschrift fur Kristallographie 956 (1995).

Nagornyi et al., Preparation and Structure of the New Fluoride Phosphate Na5CrF2(PO4)2, Russian Journal of Inorganic Chemistry 35, 470, (1990).

Arlt, et al., Na5AIF2(PO4)2: Darstellung, Kristallstruktur und Ionenleitfahigkeit, Z. anorg. allg. Chem. 547, 179 (1987).

www.webmineral.com/data/Amblygonite.shtml.

www.webmineral.com/data/Lacroixite.shtml.

www.webmineral.com/data/Montebrasite.shtml.

www.webmineral.com/data/Tavorite.shtml.

International Search Report for PCT/US97/155544.

Rangan et al., "New Titanium–Vanadium Phosphates of Nasicon and Langbeinite Structures, and Differences Between the Two Structions Toward Deintercalation of Alkali Metal,"Journal of Solid State Chemistry, 109, (1994) p 116–121.

Delmas et al., "The Nasicon–Type Phosphates ATi2(PO4)3(A=Li, Na) as Electrode. Materials, "Solid State Ionics (1988) 28–30 pp 419–423*.

Hagenmuller et al., "Intercalation in 3D–Skeleton Structures: Ionic and Electronic.Features,"Material Resources Society Symposium Proc., vol. 210 (1991) pp 323.334.

Chem. Abstrs. Svs., (1997), XP 2048304*.

Padhi et al., Lithium Intercalation into NASICON–Type Mixed Phosphates: . . . and Li2FeTi(PO4)3; 37th Power Sources Conference: Cherry Hill, New Jersey, Conference Date: Jun. 17–20, 1996, published Oct. 15, 1996.

Sisler et al., "Chemistry A Systematic Approach, "Oxford University Press, p 746, 1980.

Gopalakrishnan et al., "V2(PO4)3: A Novel NASICON–Type Vanadium Phosphate Synthesized by Oxidative deintercalation of Sodium From Na3V2(PO4)3," Chemistry of Materials, vol. 4, No. 4, Jul./Aug. 1992, pp 145–747*.

Delmas et al., "The Chemical Short Circuit Method, An Improvement in the Intercalation–Deintercalation Techniques, "Materials Research Bulletin, vol. 23, 1988, pp 65–72.

Ivanov–Schitz et al., "Electrical and Interfacial Properties of a Li3FE2(PO4)3 Single Crystal With Silver Electrodes, "Solid Staes Ionics, 91, (1996), PP 93–99.

Cretin et al., "Study of Li1+xAlxTi2x(PO4)3 for Li + Potentiometric Sensrots, "Journal of the European Ceramic Society 15, (1995), pp 1149–1156.

Chem. Abstrs. Svs., (1995) XP 2048305*.

Patent Abstracts of Japan (1994) vol. 18, No. 64, (Abstract forJP 06251764).

Okada et al., "Fe2(SO4)3 as a Cathode Material for Rechargeable Lithium Batteries," Center for Materials Science & Engineering, University of Texas, Austin Texas, (no date of publication).

Adachi et al., "Lithium Ion Conductive Solid Electrolyte, "Chemical Abstracts 112 129692 (1981).

Delmas et al., "A Nasicon–Type Phase as Intercalation Electrode: Sodium Titatium Photphate (NaTi2(PO4)3)," Material Resources Bulletin (1987).

Nanjundaswamy et al., "Synthesis, Redox Potential Evaluation and Electrochemical Characteristics of NASICON–Related 3D Framework Compounds," Solid State Ionics 92, (1996) pp 1–10.

Nadiri, "Lithium Intercalation in Lithium Titanium Phosphate (LiTix(PO4)3)," C.R. Acad. Sci., Ser. 2 (1987), 304 (9), pp 415–418 (no month available).

Cotton et al., "Advanced Inorganic Chemistry, 3rd Edition," Interscience Publishers, pp 864–868 (no month available).

Linden, "Handbook of Batteries, 2nd Edition,"McGraw–Hill, Inc. pp 36.4–36.9.

Bykov et al., Superionic Conductors Li3M2(PO4)3 (M=Fe, Sc,Cr): Synthesis, Structure and Electrophsyical Properties, Solid State Ionics, vol. 38 (1990) pp 31–52 (no month available).

Genkina, et al., "Crystal Structure of Synthetic Tavorite LiFe[PO4](OH,F)" Kristallografiya (1984), 29(1) 50–5.

Genkina, et al., "Phase formation and crystallochemistry of phosphates . . . " Izv. Akad.

Dutreilh et al., Synthesis and Crystal Structure of a New Lithium Nickel Fluorophosphates Li2[NiF(PO4)] . . . , Journal of Solid State Chemistry, 142, 1–5 (1999).

M–T Averbuch–Pouchot et al., Topics in Phosphate Chemistry; World Scientific Publishing Co., Singapore (1996); pp. 106–119.

Loiseau et al., NH4FePO4F: Structural Study and Magnetic Properties; Journal of Solid State Chemistry III, pp. 390–396 (1994).

LeMeins et al., Phase Transitions in the Na3M2(PO4)F3Family (M=Al3+,V3+,Cr3+Fe3,Ga3+): Synthesis, Thermal, Structural, and Magnetic Studies; Journal of Solid State Chemistry 148, pp. 260–277 (1999).

Moss et al., On the X–Ray identification of amblygonite and montebrasite; Mineralogical Magazine; vol. 37, No. 287, pp. 414–422; (1969).

Goodenough et al., Phospho–olivines as Positive Electrode Materials for Rechargeable Lithium Batteries: Journal of the Electrochemical Society; vol. 144, No. 4; pp 1188–1194; (1997)8*.

Yakubovich et al., The Mixed Anionic Framework in the Structure of Na2 {MnF[PO4]}; Acta Crystallographica Section C; Crystal Structure Communications; vol. C53, Part 4, pp. 395–397 (1997).

LeMeins et al., Ionic Conductivity of Crystalline and Amorphous Na3Al2(PO4)2F3; Solid State Ionics Diffusion & Reactions, vol. 111; pp. 67–75; (1998).

PCT International Search Report PCT/US01/08132 dated Sep. 27, 2001.

Reddy and Hossain, (Editor Linden) "Rechargeable Lithium Batteries (Ambient Temperature)" Handbook of Batteries Third Edition, pp. 34.1 –34.62.

* cited by examiner

LITHIUM METAL FLUOROPHOSPHATE MATERIALS AND PREPARATION THEREOF

This application is a continuation of U.S. patent application Ser. No. 09/559,861 filed on Dec. 27, 2000 now U.S. Pat. No. 6,387,568. The disclosure of the above application is incorporated herein by reference.

FIELD OF THE INVENTION

This invention relates to improved materials usable as electrode active materials, and electrodes formed from it for electrochemical cells in batteries.

BACKGROUND OF THE INVENTION

Lithium batteries are prepared from one or more lithium electrochemical cells containing electrochemically active (electroactive) materials. Such cells typically include an anode (negative electrode), a cathode (positive electrode), and an electrolyte interposed between spaced apart positive and negative electrodes. Batteries with anodes of metallic lithium and containing metal chalcogenide cathode active material are known. The electrolyte typically comprises a salt of lithium dissolved in one or more solvents, typically nonaqueous (aprotic) organic solvents. Other electrolytes are solid electrolytes typically called polymeric matrixes that contain an ionic conductive medium, typically a metallic powder or salt, in combination with a polymer that itself may be ionically conductive which is electrically insulating. By convention, during discharge of the cell, the negative electrode of the cell is defined as the anode. Cells having a metallic lithium anode and metal chalcogenide cathode are charged in an initial condition. During discharge, lithium ions from the metallic anode pass through the liquid electrolyte to the electrochemically active (electroactive) material of the cathode whereupon they release electrical energy to an external circuit.

It has recently been suggested to replace the lithium metal anode with an insertion anode, such as a lithium metal chalcogenide or lithium metal oxide. Carbon anodes, such as coke and graphite, are also insertion materials. Such negative electrodes are used with lithium-containing insertion cathodes, in order to form an electroactive couple in a cell. Such cells, in an initial condition, are not charged. In order to be used to deliver electrochemical energy, such cells must be charged in order to transfer lithium to the anode from the lithium-containing cathode. During discharge the lithium is transferred from the anode back to the cathode. During a subsequent recharge, the lithium is transferred back to the anode where it reinserts. Upon subsequent charge and discharge, the lithium ions ($Li^+$) are transported between the electrodes. Such rechargeable batteries, having no free metallic species are called rechargeable ion batteries or rocking chair batteries. See U.S. Pat. Nos. 5,418,090; 4,464,447; 4,194,062; and 5,130,211.

Preferred positive electrode active materials include $LiCoO_2$, $LiMn_2O_4$, and $LiNiO_2$. The cobalt compounds are relatively expensive and the nickel compounds are difficult to synthesize. A relatively economical positive electrode is $LiMn_2O_4$, for which methods of synthesis are known. The lithium cobalt oxide ($LiCoO_2$), the lithium manganese oxide ($LiMn_2O_4$), and the lithium nickel oxide ($LiNiO_2$) all have a common disadvantage in that the charge capacity of a cell comprising such cathodes suffers a significant loss in capacity. That is, the initial capacity available (amp hours/gram) from $LiMn_2O_4$, $LiNiO_2$, and $LiCoO_2$ is less than the theoretical capacity because significantly less than 1 atomic unit of lithium engages in the electrochemical reaction. Such an initial capacity value is significantly diminished during the first cycle operation and such capacity further diminishes on every successive cycle of operation. For $LiNiO_2$ and $LiCoO_2$ only about 0.5 atomic units of lithium is reversibly cycled during cell operation. Many attempts have been made to reduce capacity fading, for example, as described in U.S. Pat. No. 4,828,834 by Nagaura et al. However, the presently known and commonly used, alkali transition metal oxide compounds suffer from relatively low capacity. Therefore, there remains the difficulty of obtaining a lithium-containing electrode material having acceptable capacity without disadvantage of significant capacity loss when used in a cell.

SUMMARY OF THE INVENTION

The invention provides novel lithium-metal-fluorophosphate materials which, upon electrochemical interaction, release lithium ions, and are capable of reversibly cycling lithium ions. The invention provides a rechargeable lithium battery which comprises an electrode formed from the novel lithium-metal-fluorophosphates. Methods for making the novel lithium-metal-fluorophosphates and methods for using such lithium-metal-fluorophosphates in electrochemical cells are also provided. Accordingly, the invention provides a rechargeable lithium battery which comprises an electrolyte; a first electrode having a compatible active material; and a second electrode comprising the novel lithium-metal-fluorophosphate materials. The novel materials, preferably used as a positive electrode active material, reversibly cycle lithium ions with the compatible negative electrode active material. Desirably, the lithium-metal-fluorophosphate is represented by the nominal general formula $LiM_{1-y}MI_yPO_4F$ where $0 \leq y \leq 1$. Such compounds include $LiMPO_4F$ for $y=0$. Such compounds are also represented by $Li_{1-x}MPO_4F$ and $Li_{1-x}M_{1-y}MI_yPO_4F$, where in an initial condition, "x" is essentially zero; and during cycling a quantity of "x" lithium is released where $0 \leq x \leq 1$. Correspondingly, M has more than one oxidation state in the lithium-metal-fluorophosphate compound, and more than one oxidation state above the ground state $M^0$. The term oxidation state and valence state are used in the art interchangeably. Also, MI may have more than one oxidation state, and more than one oxidation state above the ground state $MI^0$.

Desirably, M is selected from V (vanadium), Cr (chromium), Fe (iron), Ti (titanium), Mn (manganese), Co (cobalt), Ni (nickel), Nb (niobium), Mo (molybdenum), Ru (ruthenium), Rh (rhodium) and mixtures thereof. Preferably, M is selected from the group V, Cr, Fe, Ti, Mn, Co, and Ni. As can be seen, M is preferably selected from the first row of transition metals, and M preferably initially has a +3 oxidation state. In another preferred aspect, M is a metal having a +3 oxidation state and having more than one oxidation state, and is oxidizable from its oxidation state in lithium-metal-fluorophosphate compound. In another aspect, MI is a metal having a +3 oxidation state, and desirably MI is an element selected from the group V, Cr, Fe, Ti, Mn, Co, Ni, Nb, Mo, Ru, Rh, B (boron) and Al (aluminum).

In a preferred aspect, the product $LiM_{1-y}MI_yPO_4F$ is a triclinic structure. In another aspect, the "nominal general formula" refers to the fact that the relative proportions of the atomic species may vary slightly on the order of up to 5 percent, or more typically, 1 percent to 3 percent. In another aspect the term "general" refers to the family of compounds with M, MI, and y representing variations therein. The expressions y and 1-y signify that the relative amount of M and MI may vary and that $0 \leq y \leq 1$. In addition, M may be a mixture of metals meeting the earlier stated criteria for M. In addition, MI may be a mixture of elements meeting the earlier stated criteria for MI.

The active material of the counter electrode is any material compatible with the lithium-metal-fluorophosphate of the invention. Where the lithium-metal-fluorophosphate is used as a positive electrode active material, metallic lithium may be used as the negative electrode active material where lithium is removed and added to the metallic negative electrode during use of the cell. The negative electrode is desirably a nonmetallic insertion compound. Desirably, the negative electrode comprises an active material from the group consisting of metal oxide, particularly transition metal oxide, metal chalcogenide, carbon, graphite, and mixtures thereof. It is preferred that the anode active material comprises a carbonaceous material such as graphite. The lithium-metal-fluorophosphate of the invention may also be used as a negative electrode material.

The starting (precursor) materials include a lithium containing compound, and a metal phosphate compound. Preferably, the lithium containing compound is in particle form, and an example is lithium salt. A particular example of a lithium salt is lithium fluoride (LiF). Preferably, the metal phosphate compound is in particle form, and examples include metal phosphate salt, such as $FePO_4$ and $CrPO_4$. The lithium compound and the metal phosphate compound are mixed in a proportion which provides the stated general formula.

In one aspect, the starting materials are intimately mixed and then reacted together where the reaction is initiated by heat. The mixed powders are pressed into a pellet. The pellet is then heated to an elevated temperature. This reaction can be run under an air atmosphere, or can be run under a non-oxidizing atmosphere. The precursors are commercially available, and include, for example, a lithium fluoride salt, and metal phosphate, such as $CrPO_4$, $FePO_4$, or $MnPO_4$.

In another aspect, the metal phosphate salt used as a precursor for the lithium metal phosphate reaction can be formed either by a carbothermal reaction, or by a hydrogen reduction reaction. Preferably, the phosphate-containing anion compound is in particle form, and examples include metal phosphate salt, diammonium hydrogen phosphate (DAHP), and ammonium dihydrogen phosphate (ADHP). The metal compound for making the precursor are typically metal oxides. In the carbo-thermal reaction, the starting materials are mixed together with carbon, which is included in an amount sufficient to reduce the metal oxide to metal phosphate. The starting materials for the formation of the metal phosphates are generally crystals, granules, and powders and are generally referred to as being in particle form. Although many types of phosphate salts are known, it is preferred to use diammonium hydrogen phosphate (DAHP), or ammonium dihydrogen phosphate (ADHP). Both DAHP and ADHP meet the preferred criteria that the starting materials decompose to liberate the phosphate anion which may then react with the metal oxide compound. Exemplary metal compounds are $Fe_2O_3$, $Fe_3O_4$, $V_2O_5$, $VO_2$, $MnO_2$, $Mn_2O_3$, $TiO_2$, $Ti_2O_3$, $Cr_2O_3$, $CoO$, $Ni_3(PO_4)_2$, $Nb_2O_5$, $Mo_2O_3$, $V_2O_3$, $FeO$, $Co_3O_4$, $CrO_3$, $Nb_2O_3$, $MoO_3$. The starting materials are available from a number of sources. For example, the metal oxides, such as vanadium pentoxide or iron oxide, are available from suppliers including Kerr McGee, Johnson Matthey, or Alpha Products of Davers, Mass.

Objects, features, and advantages of the invention include an electrochemical cell or battery based on lithium-metal-fluorophosphates. Another object is to provide a cathode active material which combines the advantages of good discharge capacity and capacity retention. It is also an object of the present invention to provide positive electrodes which can be manufactured economically. Another object is to provide a cathode active material which can be rapidly and cheaply produced and lends itself to commercial scale production for preparation of large quantities.

These and other objects, features, and advantages will become apparent from the following description of the preferred embodiments, claims, and accompanying drawings.

DETAILED DESCRIPTION OF THE PREFERRED EMBODIMENTS

Figure 1:
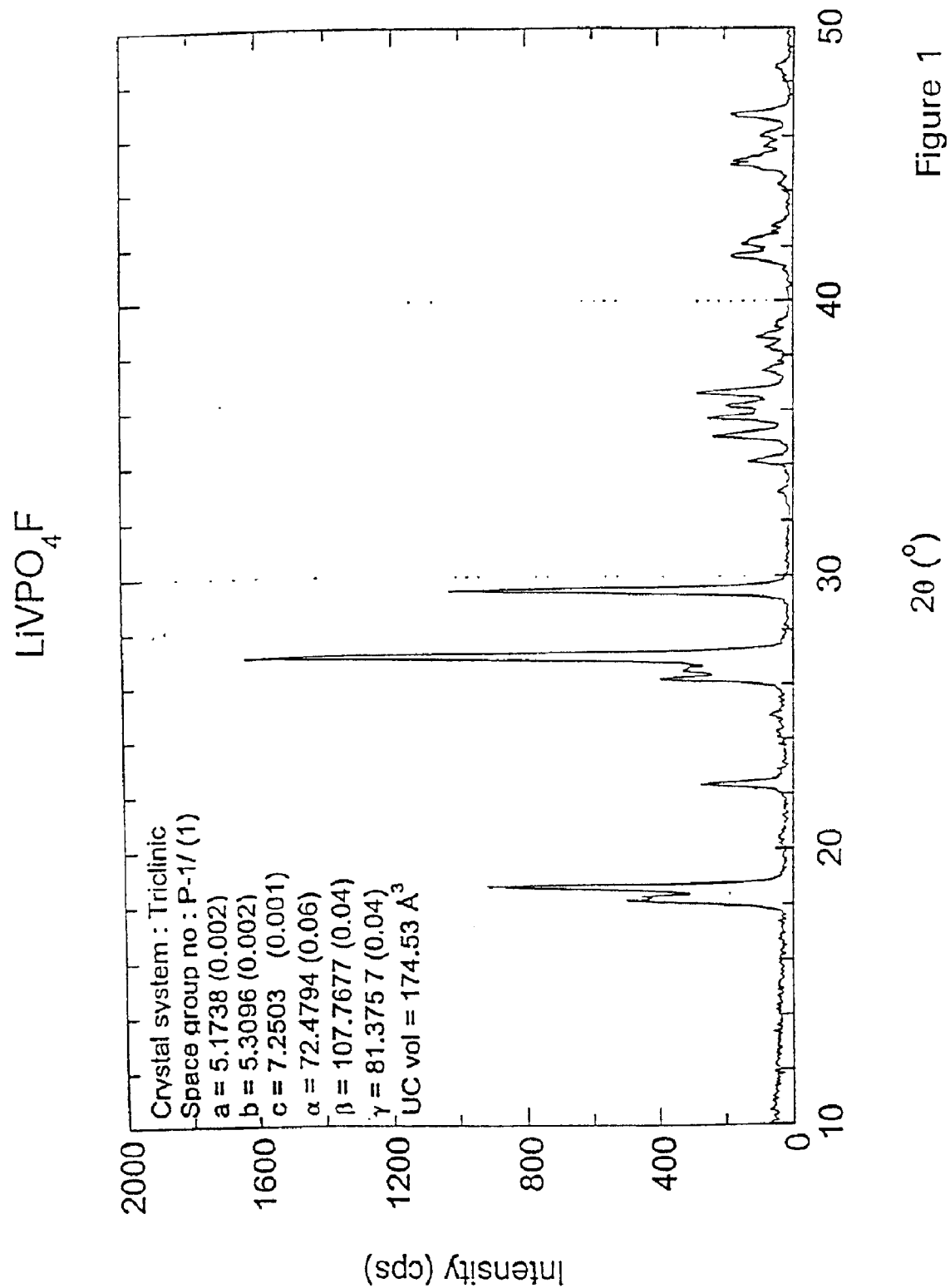
FIG. 1 shows the results of an x-ray diffraction analysis, of $LiVPO_4F$ prepared as above, using CuKα radiation, λ=1.5404 Å. Bars refer to simulated pattern from refined cell parameters SG=P−1 (triclinic) (1). The values are a=5.1738 Å (0.002), b=5.3096 Å (0.002), c=7.2503 Å (0.001); the angle α=72.4794 (0.06), β=107.7677 (0.04), γ=81.3757 (0.04), cell volume =174.35 Å³. The crystal system is triclinic.

The present invention provides lithium-metal-fluorophosphates, which are usable as electrode active materials, for lithium ($Li^+$) ion removal and insertion. Upon extraction of the lithium ions from the lithium-metal-fluorophosphates, significant capacity is achieved. In one aspect of the invention, electrochemical energy is provided when combined with a suitable counter electrode by extraction of a quantity x of lithium from lithium-metal-fluorophosphates $Li_{1-x}M_{1-y}MI_yPO_4F$. When a quantity of lithium is removed per formula unit of the lithium-metal-fluorophosphate, metal M is oxidized. Accordingly, during cycling, charge and discharge, the value of x varies as x greater than or equal to 0 and less than or equal to 1.

In another aspect, the invention provides a lithium ion battery which comprises an electrolyte; a negative electrode having an insertion active material; and a positive electrode comprising a lithium-metal-fluorophosphate active material characterized by an ability to release lithium ions for insertion into the negative electrode active material. The lithium-metal-fluorophosphate is desirably represented by the aforesaid nominal general formula $LiM_{1-y}MI_yPO_4F$. Desirably, the metal M is selected from the group: Ti, V, Cr, Mn, Fe, Co, Ni, Nb, Mo, and mixtures thereof. Preferably the metal M is selected from the group: Ti, V, Cr, Mn, Fe, Co, Ni, and mixtures thereof. Although the metals M and MI may be the same, it is preferred that M and MI be different, and desirably MI is an element selected from the group: Ti, V, Cr, Mn, Fe, Co, Ni, Nb, Mo, Al, B, and mixtures thereof.

The present invention provides a new material, a lithium metal fluorophosphate, and demonstrates that with this new material significant capacity as a cathode active material is utilizable and maintained.

A preferred approach for making the $LiM_{1-y}MI_yPO_4F$ is a two staged approach (Example I). The first stage (Reaction 1a) involves the creation of the metal phosphate precursor, followed by the second stage (Reaction 1b) of reacting the metal phosphate with the commercially available lithium fluoride to produce the lithium metal fluorophosphate. The basic procedure is described with reference to exemplary starting materials, but is not limited thereby. In the first stage, the basic process comprises reacting a metal compound, for example vanadium pentoxide or ferric oxide, with a phosphoric acid derivative, preferably a phosphoric acid ammonium salt, such as ammonium dihydrogen phosphate ADHP) or diammonium hydrogen phosphate (DAHP). The powders were intimately mixed and dry ground for about 30 minutes to form a homogeneous mixture of the starting materials. Then the mixed powders were pressed into pellets. The reaction was conducted by heating the pellets in an oven at a preferred heating rate to an elevated temperature, and held at such elevated temperature for several hours. A preferred ramp rate of 2° C./minute was used to heat to a preferred temperature of 300° C. The reaction was carried out under a reducing atmosphere of hydrogen gas. The flow rate will depend on the size of the oven and the quantity needed to maintain the atmosphere. The pellets were allowed to cool to ambient temperature, then re-ground and repressed into pellets. The reaction was continued by reheating the pellets in an oven at a preferred heating rate to a second elevated temperature, and held at such elevated temperature for several hours to complete the reaction. A preferred ramp rate of 2° C./minute was used to heat to a preferred second elevated temperature is 850° C. The reaction was carried out under a reducing atmosphere of hydrogen gas. The pellets were then allowed to cool to ambient temperature. A preferred rate of cooling was about 2° C./minute.

A preferred approach for the second stage (Reaction 1b) for making the $LiM_{1-y}MI_yPO_4F$ is to start with the commercially available precursor, lithium fluoride LiF and mix with the metal phosphate $MPO_4$. The precursors were intimately mixed and dry ground for about 30 minutes. The mixture was then pressed into pellets. Reaction was conducted by heating in an oven at a preferred ramped heating rate to an elevated temperature, and held at such elevated temperature for fifteen minutes to complete formation of the reaction product. A preferred ramp rate of 2° C./minute was used to heat to a preferred temperature of 700° C. The entire reaction was conducted under a normal air atmosphere. A covered nickel crucible to limit oxygen availability was used. In an alternative, a covered ceramic crucible can be used. The pellet was removed from the oven and allowed to cool to room temperature. Preferred cooling rates are from about 2° C./minute to about 60° C./minute, with a more preferred rate of about 50° C./minute.

In another variation, the precursor metal phosphate was created prior to the creation of the lithium-metal-fluorophosphate using the carbo-thermal method in a two staged approach (Example II). The first stage (Reaction 2a) involves the creation of the metal phosphate precursor, followed by the second stage of reacting the metal phosphate with the commercially available lithium fluoride to produce the lithium metal fluorophosphate. The basic procedure is described with reference to exemplary starting materials, but is not limited thereby. In the first stage, the basic process comprises reacting a metal compound, for example vanadium pentoxide or ferric oxide, with a phosphoric acid derivative, preferably a phosphoric acid ammonium salt, such as ammonium dihydrogen phosphate (ADHP) or diammonium hydrogen phosphate (DAHP). The powders were intimately mixed and dry ground for about 30 minutes to form a homogeneous mixture of the starting materials. Then the mixed powders were pressed into pellets. The reaction was conducted by heating the pellets in an oven at a preferred heating rate to an elevated temperature, and held at such elevated temperature for several hours. A preferred ramp rate of 2° C./minute was used to heat to a preferred temperature of 300° C.

The reaction was carried out under a non-oxidizing atmosphere of argon gas. The flow rate will depend on the size of the oven and the quantity needed to maintain the atmosphere.

The pellets were allowed to cool to ambient temperature, then re-ground and repressed into pellets. The reaction was continued by reheating the pellets in an oven at a preferred heating rate to a second elevated temperature, and held at such elevated temperature for several hours to complete the reaction. A preferred ramp rate of 2° C./minute was used to heat to a preferred second elevated temperature was 850° C. The reaction was carried out under a non-oxidizing atmosphere of argon gas. After heating for a preferred time of 8 hours, the pellets were allowed to cool to ambient temperature at a preferred rate of 2° C./minute.

A preferred approach for the second stage (Example II, Reaction 2b) for making the $LiM_{1-y}MI_yPO_4F$ is to start with the commercially available precursor, lithium fluoride LiF and mix with the metal phosphate $MPO_4$. The precursors were intimately mixed and dry ground for 30 minutes. The mixture was then pressed into pellets. Reaction was conducted by heating in an oven at a preferred ramped heating rate to an elevated temperature, and held at such elevated temperature for fifteen minutes to complete formation of the reaction product. A preferred ramp rate of 2° C./minute was used to heat to a preferred temperature of 700° C. The entire reaction was conducted under an air atmosphere, but a covered crucible was used to limit oxygen availability. The pellet was removed from the oven and allowed to cool to room temperature.

In a variation of the second stage, lithium carbonate and ammonium fluoride were used in place of lithium fluoride (Example IV). The precursors were intimately mixed and dry ground for about 30 minutes. The mixture is then pressed into pellets. Reaction was conducted by heating in an oven at a preferred ramped heating rate (of 2° C./minute) to an elevated temperature, and held at such elevated temperature for about 15 minutes to complete formation of the reaction product. A preferred elevated temperature was 700° C. The reaction was conducted under an air atmosphere in a covered crucible to limit oxygen availability. The pellet was removed from the oven and allowed to cool to room temperature. Refer to Reaction 4 herein.

A process for making lithium mixed-metal fluorophosphate, such as lithium aluminum vanadium fluorophosphate, the precursors aluminum phosphate and vanadium phosphate were made separately, then mixed with lithium fluoride (Example III, Reaction 3b). The vanadium phosphate was made as described in reaction 1(a) or reaction 2(a). The basic procedure for making aluminum phosphate is described with reference to exemplary starting materials, but is not limited thereby (Example III, Reaction 3a). The aluminum phosphate was made by intimately mixing aluminum hydroxide and ammonium dihydrogen phosphate powders, and dry groundings them for about 30 minutes. The mixed powders were then pressed into pellets. The reaction was conducted by heating the pellets in an oven at a preferred heating rate to an elevated temperature, and held at that elevated temperature for several hours. The reaction was carried out under an air atmosphere. The pellets were allowed to cool to ambient temperature, and then ground into powder. Exemplary and preferred ramp rates, elevated reaction temperatures and reaction times are described herein. In one aspect, a ramp rate of 2° C./minute was used to heat to an elevated temperature of about 950° C. and allowed to dwell for 8 hours. The precursor was then allowed to cool to room temperature. Refer to Reaction 3(a) herein.

A preferred approach for making the lithium aluminum transition metal fluorophosphate was to use the aluminum phosphate and the transition metal phosphate generated above, and mix them with lithium fluoride (Reaction 3b). The powders were intimately mixed and dry ground for about 30 minutes. The mixture was then pressed into pellets. Reaction was conducted by heating in an oven at a preferred ramped heating rate to an elevated temperature, and held at such elevated temperature for about fifteen minutes to complete the formation of the reaction product. The entire reaction was completed under a normal air atmosphere. The pellet was removed from the oven and allowed to cool to room temperature. Exemplary and preferred reaction conditions are described herein. In one aspect, a ramp rate of 2° C./minute was used to heat to an elevated temperature of 700° C. and was allowed to dwell for 15 minutes. Refer to Reaction 3(b) herein. Recent research has indicated that doping of materials with non-transition metals or other elements, such as boron, tends to increase the operating voltage. Substitution of non-transition elements such as aluminum for transition metals tends to stabilize the structure of cathode active materials. This aids the stability and cyclability of the materials.

The general aspects of the above synthesis route are applicable to a variety of starting materials. The metal compounds are reduced in the presence of a reducing agent, such as hydrogen or carbon. The same considerations apply to other metal and phosphate containing starting materials. The thermodynamic considerations such as ease of reduction, of the selected starting materials, the reaction kinetics, and the melting point of the salts will cause adjustment in the general procedure, such as the amount of reducing agent, the temperature of the reaction, and the dwell time.

Referring back to the discussion of the reactions for generating the precursor metal-phosphates, Reactions 1(a) and 2(a), the reaction is initially conducted at a relatively low temperature from 200° C. to 500° C., preferably around 300° C., cooled to ambient temperature, then conducted at a relatively high temperature from 700° C. to a temperature below the melting point of the metal phosphate, preferably around 850° C. The melting point of the metal phosphates is believed to be in the range of 950° C. to 1050° C. It is preferred to heat the starting materials at a ramp rate of a fraction of a degree to 10° C. per minute and preferably about 2° C. per minute. After reaction, the products are cooled to ambient temperature with a cooling rate similar to the ramp rate, and preferably around 2° C./minute.

Referring back to the discussion of the lithium fluoride and metal phosphate reaction (Reactions 1b, 2b, 3b, and 4), the temperature should be run at 400° C. or greater but below the melting point of the metal phosphate, and preferably at about 700° C. It is preferred to heat the precursors at a ramp rate of a fraction of a degree to 10° C. per minute and preferably about 2° C. per minute. Once the desired temperature is attained, the reactions are held at the reaction temperature from 10 minutes to several hours, and preferredly around 15 minutes. The time being dependent on the reaction temperature chosen. The heating may be conducted under an air atmosphere, or if desired may be conducted under a non-oxidizing or inert atmosphere. After reaction, the products are cooled from the elevated temperature to ambient (room) temperature (i.e. 10° C. to 40° C.). Desirably, the cooling occurs at a rate of about 50° C./minute. Such cooling has been found to be adequate to achieve the desired structure of the final product. It is also possible to quench the products at a cooling rate on the order of about 100° C./minute. In some instances, such rapid cooling may be preferred.

As an alternative to the two stage process for producing the lithium metal fluorophosphate, a single stage process is used (Example V, Reaction 5). A mixture was made of a metal compound, for example vanadium pentoxide, ammonium dihydrogen phosphate, lithium fluoride and carbon. The mixture was dry ground for about 30 minutes to intimately mix the powders. The powders were pressed into pellets. The reaction was conducted by heating the pellets in an oven at a preferred rate to a first elevated temperature for several hours. A preferred temperature is 300° C. The reaction was carried out under a non-oxidizing atmosphere. The flow rate will depend on the size of the oven and the quantity needed to maintain the temperature. The pellets were allowed to cool, then re-ground and repressed into pellets. The reaction was continued by reheating the pellets in an oven at a preferred heating rate to a second elevated temperature, and held at such elevated temperature for several hours to complete the reaction. A preferred second elevated temperature is 850° C. The reaction was carried out under a non-oxidizing atmosphere. In one aspect, a ramp rate of 2° C./minute was used to heat to an elevated temperature of about 300° C. and allowed to dwell for 3 hours. The precursor material was allowed to cool to room temperature, and subsequently heated to 850° C. along with a dwell time of 8 hours. Refer to Reaction 5 herein.

FIGS. 1 through 6 which will be described more particularly below show the characterization data and capacity in actual use for the cathode materials (positive electrodes) of the invention. Some tests were conducted in a cell comprising a lithium metal counter electrode (negative electrode). All of the cells had an EC/DMC (2:1) 1 molar LiPF$_6$ electrolyte.

Typical cell configurations will now be described with reference to FIGS. 7 and 8; and such battery or cell utilizes the novel active material of the invention. Note that the preferred cell arrangement described here is illustrative and the invention is not limited thereby. Experiments are often performed, based on full and half cell arrangements, as per the following description. For test purposes, test cells are often fabricated using lithium metal electrodes. When forming cells for use as batteries, it is preferred to use an insertion positive electrode as per the invention and a graphitic carbon negative electrode.

Figure 7:
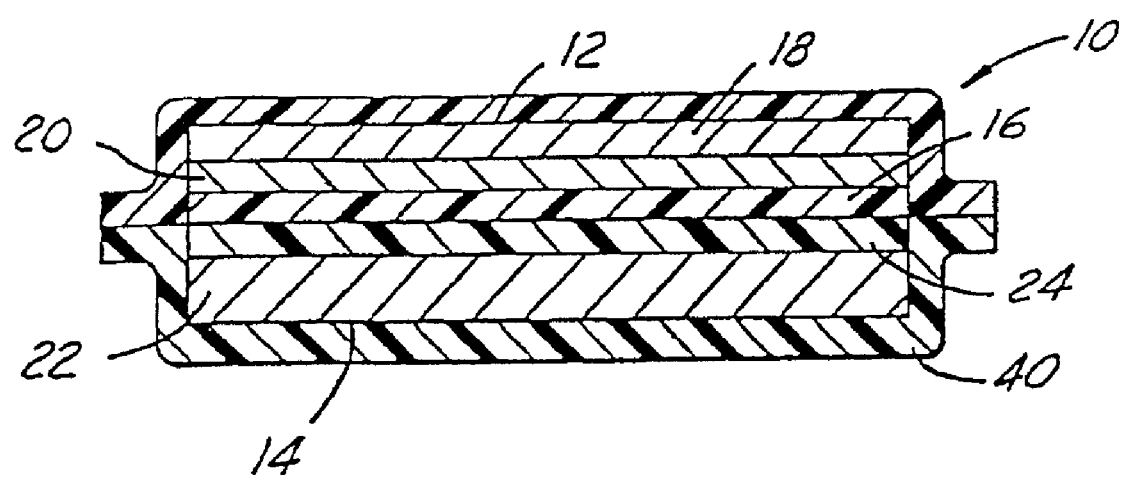
FIG. 7 is a diagrammatic representation of a typical laminated lithium-ion battery cell structure.

A typical laminated battery cell structure 10 is depicted in FIG. 7. It comprises a negative electrode side 12, a positive electrode side 14, and an electrolyte/separator 16 there between. Negative electrode side 12 includes current collector 18, and positive electrode side 14 includes current collector 22. A copper collector foil 18, preferably in the form of an open mesh grid, upon which is laid a negative electrode membrane 20 comprising an insertion material such as carbon or graphite or low-voltage lithium insertion compound, dispersed in a polymeric binder matrix. An electrolyte/separator film 16 membrane is preferably a plasticized copolymer. This electrolyte/separator preferably comprises a polymeric separator and a suitable electrolyte for ion transport. The electrolyte/separator is positioned upon the electrode element and is covered with a positive electrode membrane 24 comprising a composition of a finely divided lithium insertion compound in a polymeric binder matrix. An aluminum collector foil or grid 22 completes the assembly. Protective bagging material 40 covers the cell and prevents infiltration of air and moisture.

Figure 8:
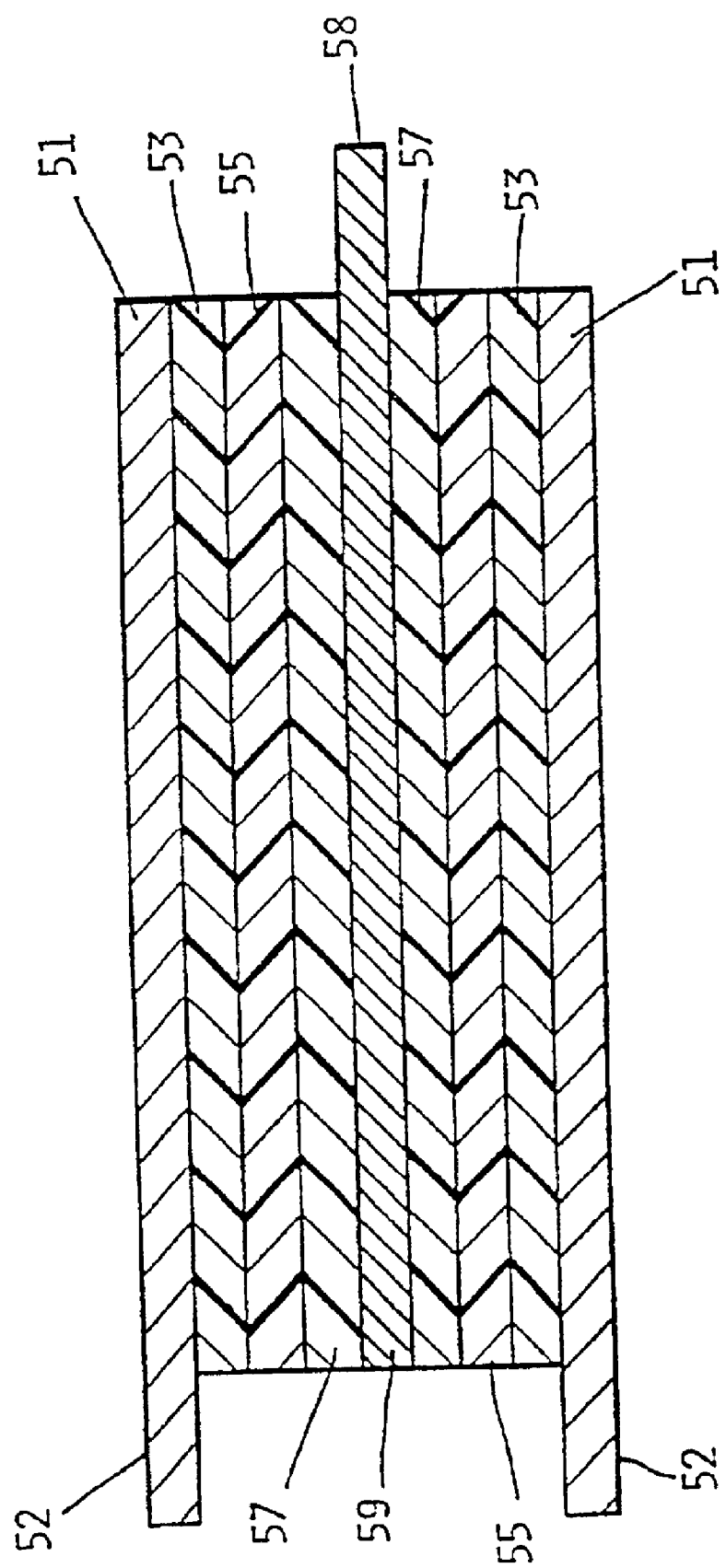
FIG. 8 is a diagrammatic representation of a typical multi-cell battery cell structure.

In another embodiment, a multi-cell battery configuration as per FIG. 8 is prepared with copper current collector 51, negative electrode 53, electrolyte/separator 55, positive electrode 57, and aluminum current collector 59. Tabs 52 and 58 of the current collector elements form respective terminals for the battery structure. As used herein, the terms "cell" and "battery" refer to an individual cell comprising anode/electrolyte/cathode and also refer to a multi-cell arrangement in a stack.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–95 weight percent. The negative electrode comprises about 50–95% by weight of a preferred graphite, with the balance constituted by the binder. A typical electrolyte separator film comprises approximately two parts polymer for every one part of a preferred fumed silica. The conductive solvent comprises any number of suitable solvents and salts. Desirable solvents and salts are described in U.S. Pat. Nos. 5,643,695 and 5,418,091. One example is a mixture of EC:DMC:LiPF$_6$ in a weight ratio of about 60:30:10.

Solvents are selected to be used individually or in mixtures, and include dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, etc. The preferred solvents are EC/DMC, EC/DEC, EC/DPC and EC/EMC. The salt content ranges from 5% to 65% by weight, preferably from 8% to 35% by weight.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

In the construction of a lithium-ion battery, a current collector layer of aluminum foil or grid is overlaid with a positive electrode film, or membrane, separately prepared as a coated layer of a dispersion of insertion electrode composition. This is typically an insertion compound such as LiMn$_2$O$_4$ (LMO), LiCoO$_2$, or LiNiO$_2$, powder in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, insertion electrodes, solid electrolytes and liquid electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VdF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

As described earlier, the electrochemical cell operated as per the invention, may be prepared in a variety of ways. In one embodiment, the negative electrode may be metallic lithium. In more desirable embodiments, the negative electrode is an insertion active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells are often fabricated using lithium metal electrodes. When forming cells for use as batteries, it is preferred to use an insertion metal oxide positive electrode and a graphitic carbon negative electrode. Various methods for fabricating electrochemical cells and batteries and for forming electrode components are described herein. The invention is not, however, limited by any particular fabrication method.

Formation of Active Materials

EXAMPLE I

Reaction 1(a)—Using hydrogen to form precursors $$0.5\ V_2O_5 + NH_4H_2PO_4 + H_2 \rightarrow VPO_4 + NH_3 + 2.5\ H_2O$$

(a) Pre-mix reactants in following proportions using ball mill. Thus,

| | |
|---|---|
| 0.5 mol $V_2O_5$ = | 90.94 g |
| 1.0 mol $NH_4H_2PO_4$ = | 115.03 g |

(b) Pelletize the power mixture.
(c) Heat to 300° C. at a rate of 2° C./minute in a flowing $H_2$ atmosphere. Dwell for 8 hours at 300° C.
(d) Cool at 2° C./minute to room temperature.
(e) Powderize and re-pelletize.
(f) Heat to 850° C. in a flowing $H_2$ atmosphere at a rate of 2° C./minute. Dwell for 8 hours at 850° C.
(g) Cool at 2° C./minute to room temperature.

Reaction 1(b)—formation of lithium vanadium fluorophosphate $$LiF + VPO_4 \rightarrow LiVPO_4F$$

(a) Pre-mix reactants in equi-molar portions using a ball mill. Thus,

| | |
|---|---|
| 1 mol LiF = | 25.94 g |
| 1 mol $VPO_4$ = | 145.91 g |

(b) Pelletize powder mixture.
(c) Heat to 700° C. at a rate of 2° C./minute in an air atmosphere in a covered nickel crucible. Dwell for 15 minutes at 700° C.
(d) Cool to room temperature at about 50° C./minute.
(e) Powderize pellet.

EXAMPLE II

Reaction 2(a)—Using a carbothermal method to form precursors.

$$0.5\ V_2O_5 + NH_4H_2PO_4 + C \rightarrow VPO_4 + NH_3 + 1.5H_2O + CO$$

(a) Pre-mix reactants in the following proportions using ball mill. Thus,

| | |
|---|---|
| 0.5 mol $V_2O_5$ = | 90.94 g |
| 1.0 mol $NH_4H_2PO_4$ = | 115.03 g |
| 1.0 mol carbon = | 12.0 g |

(Use 10% excess carbon → 13.2 g)

(b) Pelletize powder mixture
(c) Heat pellet to 300° C. at a rate of 2° C./minute in an inert atmosphere (e.g., argon). Dwell for 3 hours at 300° C.
(d) Cool to room temperature at 2° C./minute.
(e) Powderize and re-pelletize.
(f) Heat pellet to 850° C. at a rate of 2° C./minute in an inert atmosphere (e.g. argon). Dwell for 8 hours at 850° C. under an argon atmosphere.
(g) Cool to room temperature at 2° C./minute.
(h) Powderize pellet.

Reaction 2(b)—formation of lithium vanadium fluorophosphate $$LiF + VPO_4 \rightarrow LiVPO_4F$$

(a) Pre-mix reactants in equi-molar portions using a ball mill. Thus,

| | |
|---|---|
| 1 mol LiF = | 25.94 g |
| 1 mol $VPO_4$ = | 145.91 g |

(b) Pelletize powder mixture.
(c) Heat to 700° C. at a rate of 2° C./minute in an air atmosphere in a nickel crucible. Dwell for 15 minutes at 700° C.
(d) Cool to room temperature at about 50° C./minute.
(e) Powderize pellet.

EXAMPLE III

Reaction 3(a)—Formation of aluminum phosphate.

$$Al(OH)_3 + NH_4H_2PO_4 \rightarrow AlPO_4 + NH_3 + 3H_2O$$

(a) Premix reactants in equi-molar portions using a ball mill. Thus,

| | |
|---|---|
| 1.0 mol Al$(OH)_3$ = | 78.0 g |
| 1.0 mol $NH_4H_2PO_4$ = | 115.03 g |

(b) Pelletize powder mixture.
(c) Heat to 950° C. at a rate of 2° C./minute in an air atmosphere. Dwell for 8 hours at 950° C.
(d) Cool to room temperature at about 50° C./minute.
(e) Powderize.

Reaction 3(b)—Formation of lithium vanadium aluminum fluorophosphate $$0.9\ VPO_4 + 0.1 AlPO_4 + 1.0 LiF \rightarrow LiV_{0.9}Al_{0.1}PO_4F$$

(a) Pre-mix reactants in the following proportions using ball mill. Thus,

| | |
|---|---|
| 0.9 mol VPO$_4$ = | 131.3 g |
| 0.1 mol AlPO$_4$ = | 12.2 g |
| 1.0 mol LiF = | 25.9 g |

(b) Pelletize powder mixture.
(c) Heat to 700° C. at a rate of 2° C./minute in a nickel crucible in either an air or inert atmosphere. Dwell for 15 minutes at 700° C.
(d) Cool to room temperature at about 50° C./minute.
(e) Powderize.

EXAMPLE IV

Reaction 4—Production of lithium vanadium fluorophosphate in an alternate formulation.

$$0.5\ Li_2CO_3 + NH_4F + VPO_4 \rightarrow LiVPO_4F + 0.5\ H_2O + NH_3 + 0.5CO_2$$

(a) Pre-mix reactants in the following proportions using a ball mill. Thus,

| | |
|---|---|
| 0.5 mol Li$_2$CO$_3$ = | 37.0 g |
| 1.0 mol NH$_4$F = | 37.0 g |
| 1.0 mol VPO$_4$ = | 145.9 g |

(b) Pelletize powder mixture.
(c) Heat to 700° C. at a rate of 2° C./minutes in an air atmosphere. Dwell for 15 minutes at 700° C.
(d) Cool to room temperature.
(e) Powderize pellet.

EXAMPLE V

Reaction 5— Single step preparation of lithium vanadium fluorophosphate using lithium fluoride in a carbothermal method.

$$0.5\ V_2O_5 + NH_4H_2PO_4 + LiF + C \rightarrow LiVPO_4F + NH_3 + CO + 1.5\ H_2O$$

(a) Pre-mix reactants in the following proportions using a ball mill. Thus,

| | |
|---|---|
| 0.5 mol V$_2$O$_5$ = | 90.94 g |
| 1.0 mol NH$_4$H$_2$PO$_4$ = | 115.03 g |
| 1.0 mol LiF = | 25.94 g |
| 1.0 mol carbon = | 12.0 g |

(Use 10% excess carbon → 13.2 g)

(b) Pelletize powder mixture.
(c) Heat pellet to 300° C. at a rate of 2° C./minute in an inert atmosphere. Dwell for 3 hours at 300° C.
(d) Cool to room temperature at 2° C./minute.
(e) Powderize and repelletize.
(f) Heat pellet to 750° C. at a rate of 2° C./minute in an inert atmosphere (e.g. argon). Dwell for 1 hour at 750° C. under an argon atmosphere.
(g) Cool to room temperature at 2° C./minute.
(h) Powderize pellet.

EXAMPLE VI

Reaction 6a—Formation of iron phosphate.

$$0.5\ Fe_2O_3 + (NH_4)_2HPO_4 \rightarrow FePO_4 + 2NH_3 + 3/2H_2O$$

(a) Pre-mix reactants in the following proportions using a ball mill. Thus,

| | |
|---|---|
| 0.5 mol Fe$_2$O$_3$ = | 79.8 g |
| 1.0 mol (NH$_4$)$_2$ HPO$_4$ = | 132.1 g |

(b) Pelletize powder mixture.
(c) Heat to 300° C. at 2° C./minute in air atmosphere. Dwell 8 hours and cool to room temperature.
(d) Re-pelletize.
(e) Heat to 900° C. at 2° C./minute in air atmosphere. Dwell 8 hours and cool to room temperature.
(f) Powderize.

Reaction 6b—Formation of LiFePO$_4$F $$FePO_4 + LiF \rightarrow LiFePO_4F$$

(a) Pre-mix reactants in the following proportions using a ball mill. Thus,

| | |
|---|---|
| 1 mol FePO$_4$ = | 150.8 g |
| 1 mol LiF = | 25.9 g |

(b) Pelletize.
(c) Heat to 700° C. at 2° C./minute in air atmosphere.
(d) 15 minute dwell.
(e) Cool to room temperature.
(f) Powderize.

EXAMPLE VII

Reaction 7a—Formation of titanium phosphate.

$$TiO_2 + NH_4H_2PO_4 + 0.5\ H_2 \rightarrow TiPO_4 + NH_3 + 2\ H_2O$$

(a) Pre-mix reactants in the following proportions using a ball mill. Thus,

| | |
|---|---|
| 1.0 mol TiO$_2$ = | 79.9 g |
| 1.0 mol NH$_4$H$_2$PO$_4$ = | 115.0 g |

(b) Pelletize powder mixture.
(c) Heat to 300° C. at 2° C./minute in air atmosphere. Dwell for 3 hours.
(d) Cool to room temperature.
(e) Re-pelletize.
(f) Heat to 850° C. at 2° C./minute in H$_2$ atmosphere. Dwell for 8 hours.
(g) Cool to room temperature.
(h) Powderize.

Reaction 7b—Formation of LiTiPO$_4$F.

$$TiPO_4 + LiF \rightarrow LiTiPO_4F$$

(a) Pre-mix reactants in the following proportions using a ball mill. Thus,

| | |
|---|---|
| 1 mol TIPO$_4$ = | 142.9 g |
| 1 mol LiF = | 25.9 g |

(b) Pelletize powder mixture.
(c) Heat to 700° C. at 2° C./minute in inert atmosphere.
(d) No dwell.
(e) Cool to room temperature.
(f) Powderize.

EXAMPLE VIII
Reaction 8a—Formation of chromium phosphate.

$$0.5\ Cr_2O_3 + 1.0(NH_4)_2\ HPO_4 \rightarrow CrPO_4 + 2NH_3 + 3/2H_2O$$

(a) Pre-mix reactants in the following proportions using a ball mill. Thus,

| | |
|---|---|
| 0.5 mol Cr$_2$O$_3$ = | 76.0 g |
| 1.0 mol (NH$_4$)$_2$HPO$_4$ = | 132.1 g |

(b) Pelletize powder mixture.
(c) Heat to 500° C. at 2° C./minute in air atmosphere. Dwell 6 hours and cool to room temperature.
(d) Re-pelletize.
(e) Heat to 1050° C. at 2° C./minute in air atmosphere. Dwell 6 hours and cool to room temperature.
(f) Powderize.

Reaction 8b—Formation of LiCrPO$_4$F $$CrPO_4 + LiF \rightarrow LiCrPO_4F$$

(a) Pre-mix reactants in the following proportions using a ball mill. Thus,

| | |
|---|---|
| 1 mol CrPO$_4$ = | 147.0 g |
| 1 mol LiF = | 25.9 g |

(b) Pelletize powder mixture.
(c) Heat to 700° C. at 2° C./minute in air atmosphere.
(d) 15 minute dwell.
(e) Cool to room temperature.
(f) Powderize.

Characterization of Active Materials and Formation and Testing of Cells

Referring to FIG. 1, the final product LIVPO$_4$F, prepared from VPO$_4$ metal compound per Reaction 1(b), appeared black in color. The product is a material with a triclinic crystal structure. The triclinic unit cell crystal structure is characterized by a lack of symmetry. In a triclinic crystal structure, a≠b≠c, and α≠β≠γ≠90°. This product's CuKα x-ray diffraction (XRD) pattern contained all of the peaks expected for this material as shown in FIG. 1. The pattern evident in FIG. 1 is consistent with the single phase triclinic phosphate LiVPO$_4$F. This is evidenced by the position of the peaks in terms of the scattering angle 2θ (theta), x axis. Here the space group and the lattice parameters from XRD refinement are consistent with the triclinic structure. The values are a=5.1738 Å (0.002), b=5.3096 Å (0.002), c=7.2503 Å (0.001); the angle α=72.4794 (0.06), β=107.7677 (0.04), γ=81.3757 (0.04), cell volume=174.35 Å$^3$.

The x-ray pattern demonstrates that the product of the invention was indeed the nominal formula LiVPO$_4$F. The term "nominal formula" refers to the fact that the relative proportion of atomic species may vary slightly on the order of up to 5 percent, or more typically, 1 percent to 3 percent. In another aspect, any portion of P (phosphorous) may be substituted by Si (silicon), S (sulfur) and/or As (arsenic).

Figure 2:
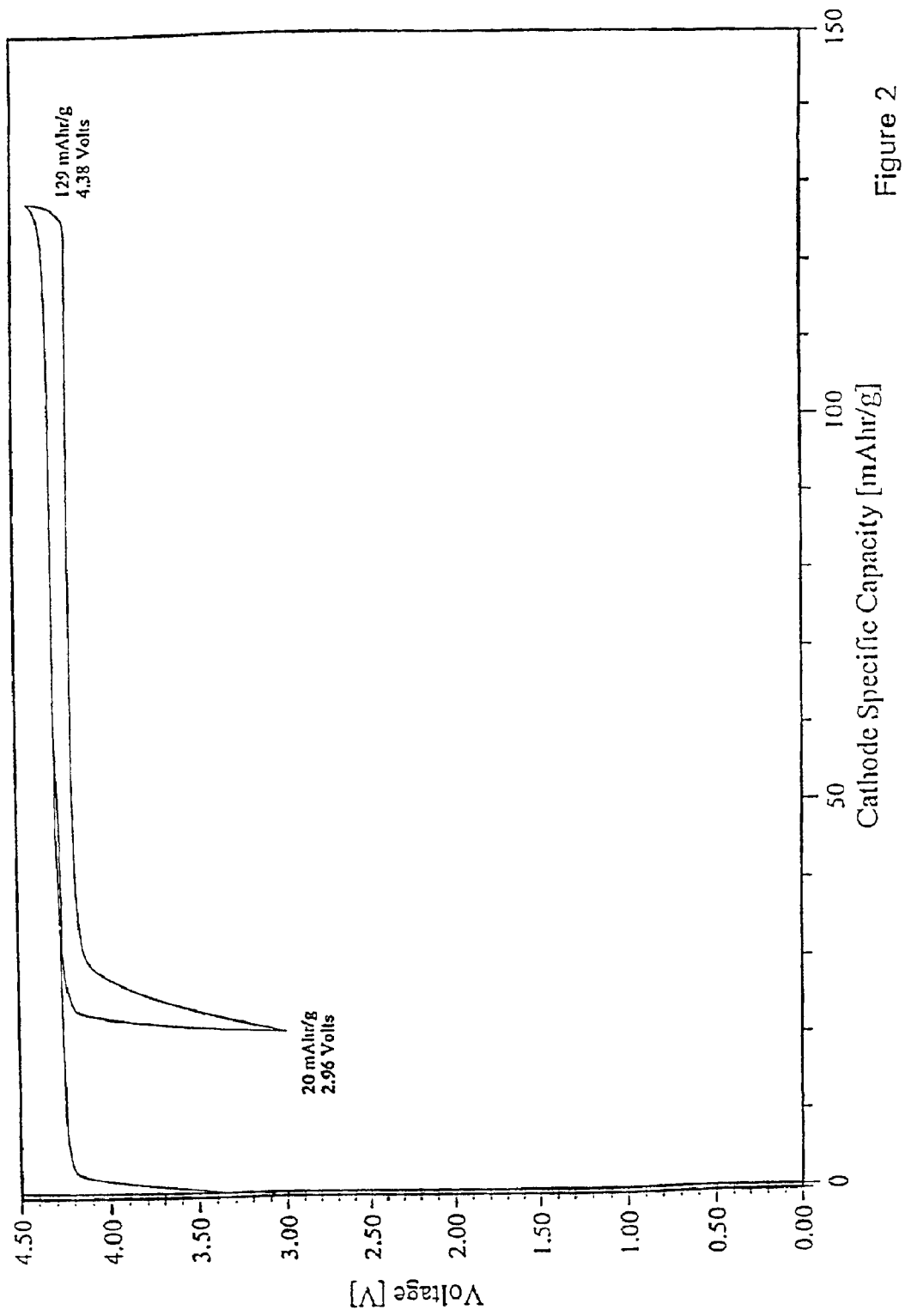
FIG. 2 is a voltage/capacity plot of $LiVPO_4F$ containing cathode cycled with a lithium metal anode in a range of 3.0 to 4.4 volts. The cathode contained 29.4 mg of $LiVPO_4F$ active material prepared by the method described above.

The LiVPO$_4$F, prepared as described immediately above, was tested in an electrochemical cell. The positive electrode was prepared as described above, using 22.5 mg of active material. The positive electrode contained, on a weight % basis, 80% active material, 8% carbon black, and 12% Kynar. Kynar is commercially available PVdF:HFP copolymers used as binder material. The negative electrode was metallic lithium. The electrolyte was 2:1 weight ratio mixture of EC and DMC within which was dissolved 1 molar LiPF$_6$. The cells were cycled between 3.5 and 4.4 with performance as shown in FIG. 2. FIG. 2 is an Electrochemical Voltage Spectroscopy (EVS) voltage/capacity profile for a cell with cathode material formed with LIVPO$_4$F. FIG. 2 shows the results of the first cycle with the critical limiting current density less than 0.1 milliamps per square centimeter with ±10 mV steps between about 3.0 and 4.4 volts based upon 29.4 milligrams of the LiVPO$_4$F active material in the cathode (positive electrode). In an as prepared, as assembled, initial condition, the positive electrode active material is LiVPO$_4$F. The lithium is extracted from the LiVPO$_4$F during charging of the cell. When fully charged, about 0.75 unit of lithium had been removed per formula unit. Consequently, the positive electrode active material corresponds to Li$_{1-x}$VPO$_4$F where x appears to be equal to about 0.75, when the cathode material is at 4.4 volts versus Li/Li$^+$. The extraction represents approximately 129 milliamp hours per gram corresponding to about 3.8 milliamp hours based on 29.4 milligrams active material. Next, the cell is discharged whereupon a quantity of lithium is re-inserted into the LiVPO$_4$F. The re-insertion corresponds to approximately 109 milliamp hours per gram proportional to the insertion of essentially all of the lithium. The bottom of the curve corresponds to approximately 3.0 volts.

Figure 3:
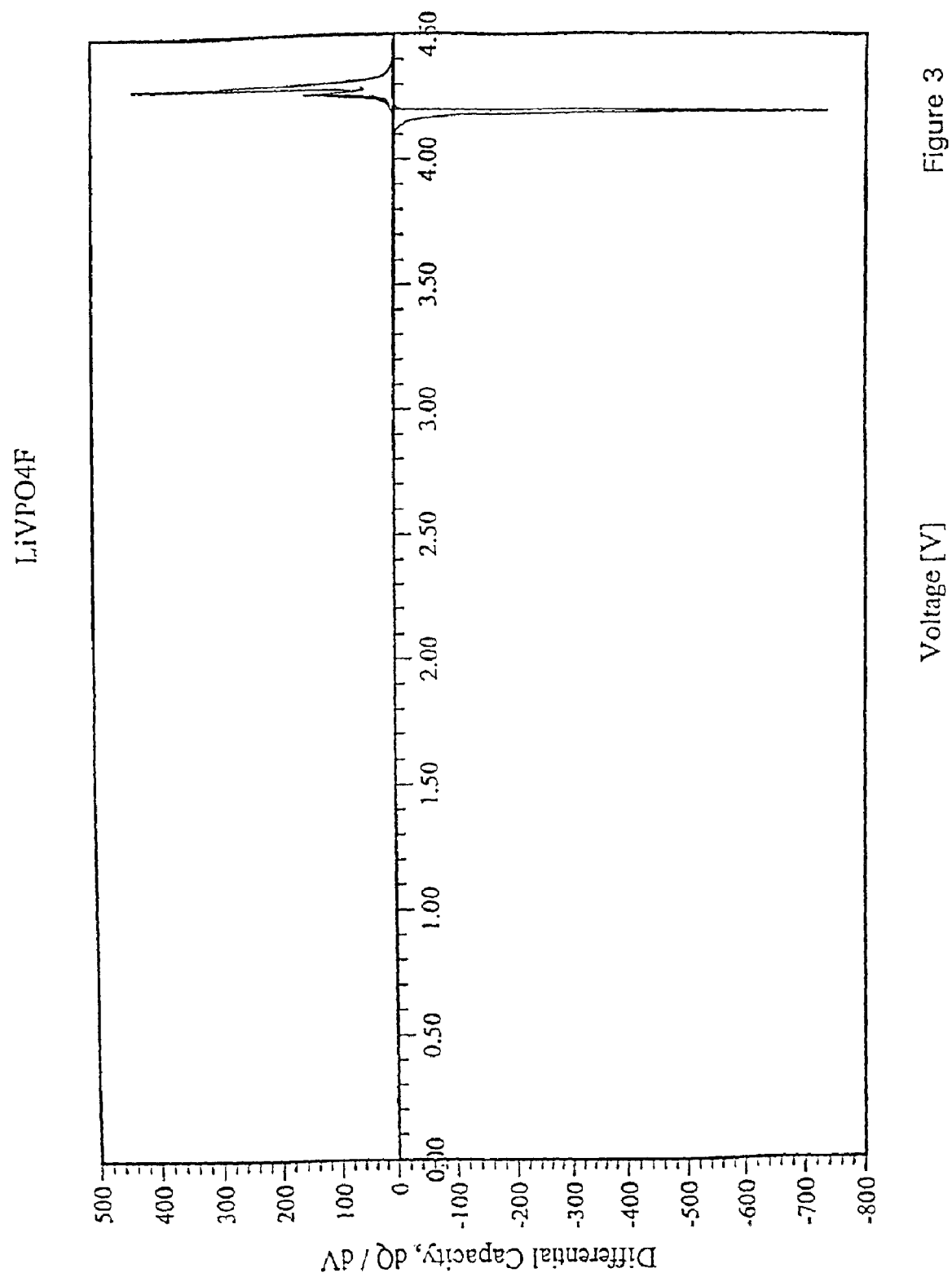
FIG. 3 displays the differential capacity during cell charge and discharge vs. cell voltage for the electrochemical cell containing $LiVPO_4F$.

FIG. 3 is an Electrochemical Voltage Spectroscopy differential capacity plot based on FIG. 2. As can be seen from FIG. 3, the relatively symmetrical nature of the peaks indicates good electrical reversibility. There are small peak separations (charge/discharge), and good correspondence between peaks above and below the zero axis. There are essentially no peaks that can be related to irreversible reactions, since peaks above the axis (cell charge) have corresponding peaks below the axis (cell discharge), and there is very little separation between the peaks above and below the axis. This shows that the LiVPO$_4$F as high quality electrode material.

Figure 4:
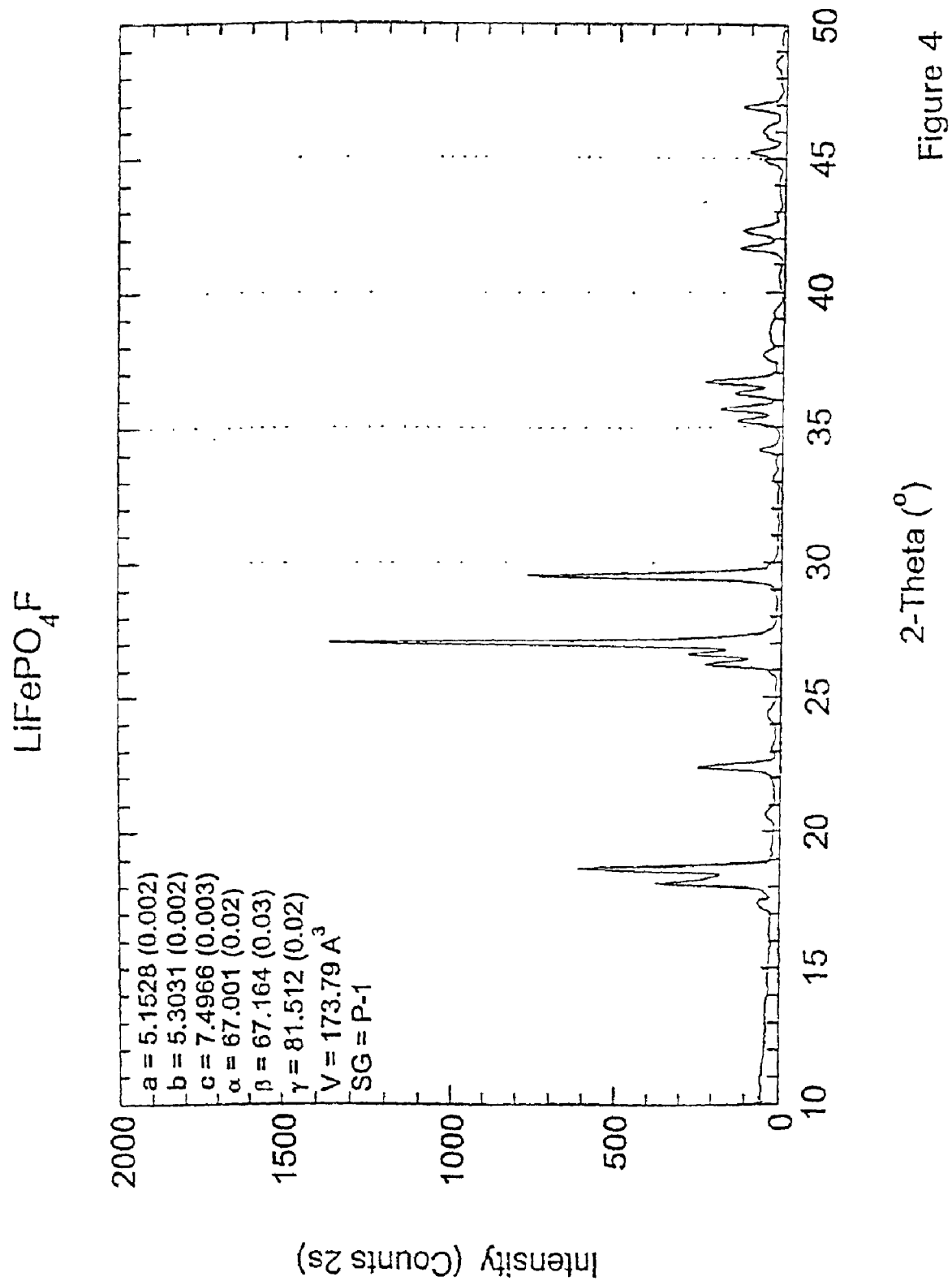
FIG. 4 shows the results of an x-ray diffraction analysis, of $LiFePO_4F$ prepared as above, using CuKα radiation, λ=1.5404 Å. Bars refer to simulated pattern from refined cell parameters SG=P−1 (triclinic). The values are a=5.1528 Å (0.002), b=5.3031 Å (0.002), c=7.4966 Å (0.003); the angle α=67.001° (0.02), β=67.164° (0.03), γ=81.512° (0.02), cell volume=173.79 Å³. The crystal system is triclinic.

Referring to FIG. 4, the final product LiFePO$_4$F, prepared from FePO$_4$ metal compound per Reaction 6(b), appeared brown in color. (Reactions 6a and 6b are carried out in the same manner as reactions 1a and 1b.) The product is a material with a triclinic crystal structure. This product's CuKα x-ray diffraction pattern contained all of the peaks expected for this material as shown in FIG. 4. The pattern evident in FIG. 4 is consistent with the single phase triclinic phosphate LiFePO$_4$F. This is evidenced by the position of the peaks in terms of the scattering angle 2θ (theta), x axis. Here the space group and the lattice parameters from XRD refinement are consistent with the triclinic structure. The values are a=5.1528 Å (0.002), b=5.3031 Å (0.002), c=7.4966 Å (0.003); the angle α=67.001° (0.02), β=67.164° (0.03), γ=81.512° (0.02), cell volume=173.79 Å$^3$. The x-ray pattern demonstrates that the product of the invention was indeed the nominal formula LiFePO$_4$F.

Figure 5:
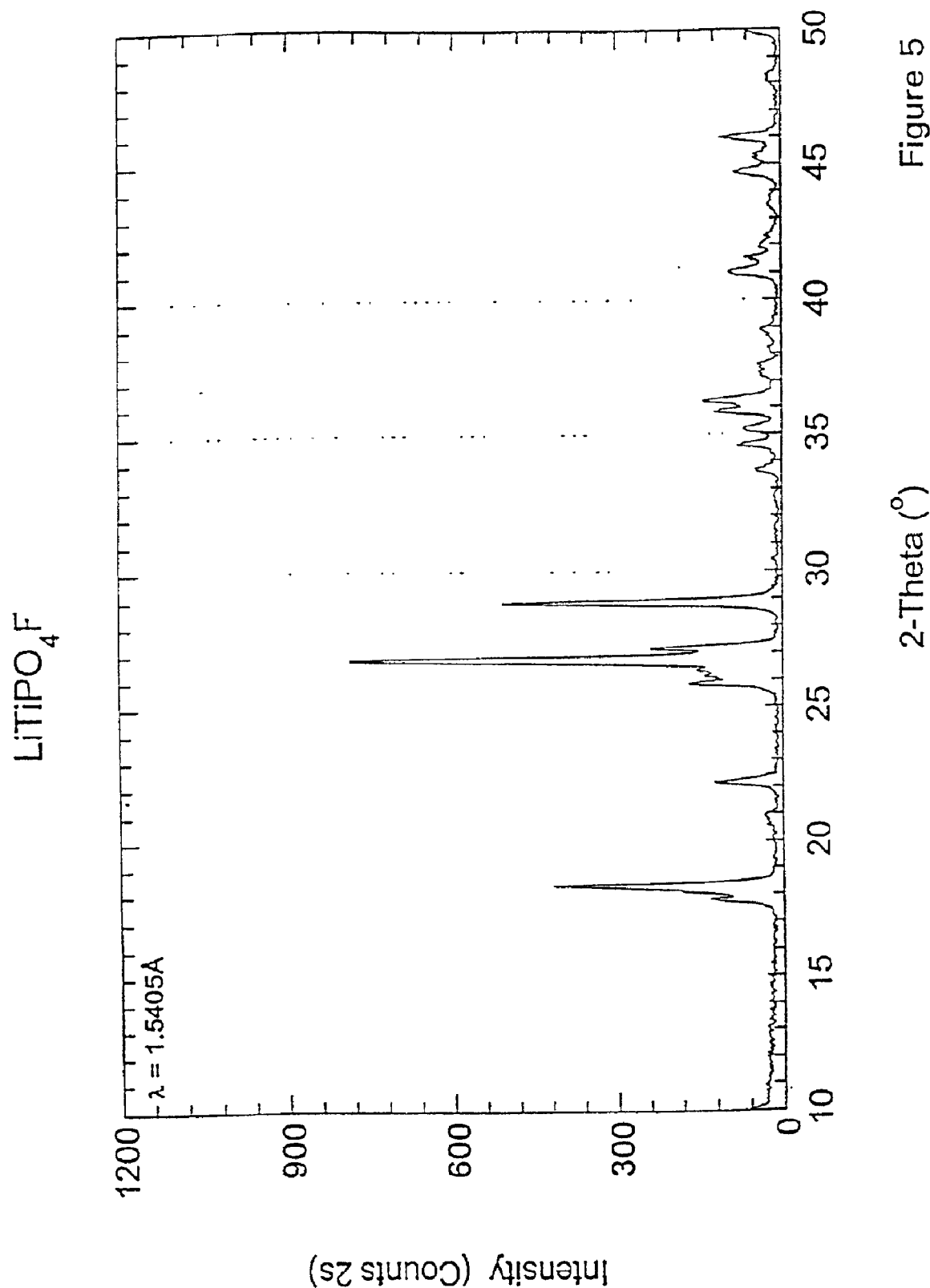
FIG. 5 shows the results of an x-ray diffraction analysis, of $LiTiPO_4F$ prepared as above, using CuKα radiation, λ=1.5404 Å. The x-ray diffraction pattern was triclinic.

Referring to FIG. 5, the final product LiTiPO$_4$F, prepared from TiPO$_4$ metal compound per Reaction 7(b), appeared green in color. (Reactions 7a and 7b are carried out in the same manner as reactions 1a and 1b.) The product is a material with a triclinic crystal structure. This product's CuKα x-ray diffraction (XRD) pattern contained all of the peaks expected for this material as shown in FIG. 5. The pattern evident in FIG. 5 is consistent with the single phase triclinic phosphate LiTiPO$_4$F. This is evidenced by the position of the peaks in terms of the scattering angle 2θ (theta), x axis. The x-ray diffraction pattern was triclinic.

Figure 6:
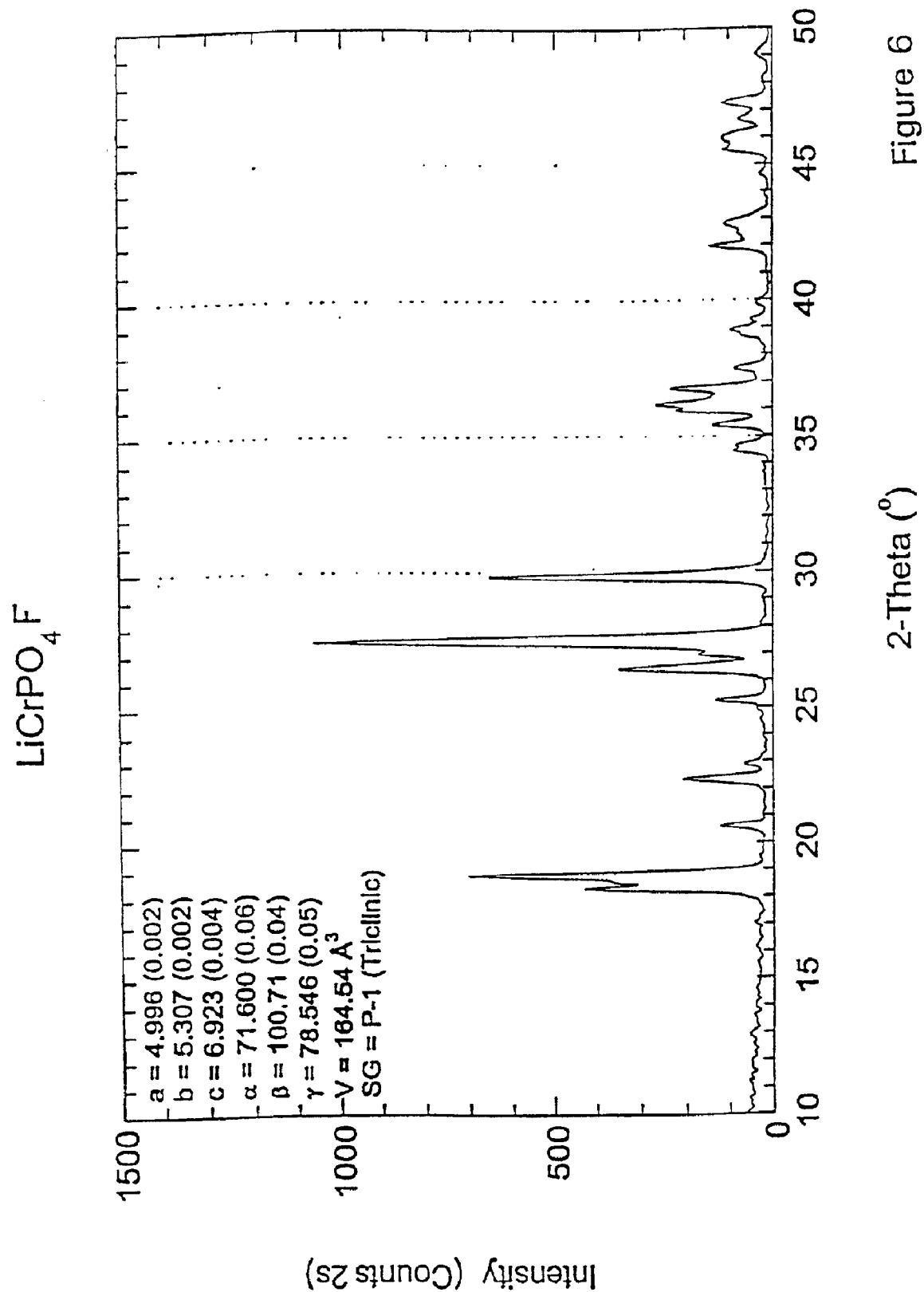
FIG. 6 shows the results of an x-ray diffraction analysis, of $LiCrPO_4F$ prepared as above, using CuKα radiation, λ=1.5404 Å. Bars refer to simulated pattern from refined cell parameters SG=P−1 (triclinic). The values are a=4.996 Å (0.002), b=5.307 Å (0.002), c=6.923 Å (0.004); the angle α=71.600°. (0.06), β=100.71° (0.04), γ=78.546°.(0.05), cell volume=164.54 Å³. The crystal system is triclinic.

Referring to FIG. 6, the final product LiCrPO$_4$F, prepared from CrPO$_4$ metal compound per Reaction 8(b), appeared green in color. (Reactions 8a and 8b are carried out in the same manner as reactions 1a and 1b.) The product is a material with a triclinic crystal structure. This product's CuKα x-ray diffraction pattern contained all of the peaks expected for this material as shown in FIG. 6. The pattern evident in FIG. 6 is consistent with the single phase triclinic phosphate LiCrPO$_4$F. This is evidenced by the position of the peaks in terms of the scattering angle 2 θ (theta), x axis. Here the space group and the lattice parameters from XRD refinement are consistent with the triclinic structure. The values are a=4.996 Å (0.002), b=5.307 Å (0.002), c=6.923 Å (0.004); the angle α=71.600° (0.06), β=100.71° (0.04), γ=78.546° (0.05), cell volume=164.54 Å$^3$. The x-ray pattern demonstrates that the product of the invention was indeed the nominal formula LiCrPO$_4$F.

As demonstrated by the above example, the methods described herein have successfully been used to make the LiM$_{1-y}$MI$_y$PO$_4$F compounds. These methods produce products which are essentially homogeneous, single phase compounds. Although small amounts of other materials or phases may be present, such does not alter the essential character of the products so produced.

In summary, the invention provides new compounds LiM$_a$MI$_b$PO$_4$F, more specifically, LiM$_{1-y}$MI$_y$PO$_4$F, which are adaptable to commercial scale production. The new compounds are triclinic compounds as demonstrated by XRD analysis. The new materials demonstrate relatively high specific capacity coupled to a desirable voltage range and energetic reversibility. These properties make these materials excellent candidates as cathode active compound for lithium ion applications. The new materials of the invention are easily and conveniently produced from available precursors with no loss of weight, or generation of waste products. The precursors can be produced by methods, such as carbothermal reduction. In other words, this invention provides new compounds capable of being commercially and economically produced for use in batteries. In addition, the use of lighter non-transition metals and elements mixed with the transition metal in the lithium metal fluorophosphate provides for structural stability and better recycling of the lithium ions.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A compound represented by the nominal general formula

LiM$_{1-y}$MI$_y$PO$_4$F, wherein:
(a) M has more than one oxidation state above the ground state M$^0$ and is selected form the group consisting of Mn, V, Cr, Ti, Fe, Ca, Ni, and mixtures thereof;
(b) MI is selected from the group consisting of Mn, V, Cr, Ti, Fe, Ca, Ni, Nb, Mo, Al, B, and mixtures thereof, with the proviso that when M is Fe, MI is selected from the group consisting of Mn, V, Cr, Ti, Co, Ni, Nb, Mo, Al, B, and mixtures thereof; and
(c) 0<y<1.

2. The compound of claim 1, wherein M has a +3 oxidation state.

3. The compound of claim 2, wherein MI has a +3 oxidation state.

4. The compound of claim 1, wherein M and MI are the same element.

5. The compound of claim 1, wherein M and MI are different elements.

6. The compound of claim 1, wherein M is selected from the group consisting of Mn, V, Cr, Ti, Fe, Co, and Ni.

7. The compound of claim 1, wherein M is selected from the group consisting of Fe, Co, Mn, and mixtures thereof.

8. The compound of claim 1, wherein M is a mixture of Fe and Co.

9. The compound of claim 1, wherein M is Fe.

10. The compound of claims 9, wherein MI comprises Al.

11. The compound of claim 9, wherein MI is Al.

12. The compound of claim 1, wherein the compound is represented by the nominal formula LiMnPO$_4$F.

13. The compound of claim 1, wherein the compound is represented by the nominal formula LiVPO$_4$F.

14. The compound of claim 1, wherein the compound is represented by the nominal formula LiCrPO$_4$F.

15. The compound of claim 1, wherein the compound is represented by the nominal formula LiTiPO$_4$F.

16. The compound of claim 1, wherein the compound is represented by the nominal formula LiV$_{0.9}$Al$_{0.1}$PO$_4$F.

17. The compound of claim 1, wherein the compound has a triclinic structure.

* * * * *

UNITED STATES PATENT AND TRADEMARK OFFICE
CERTIFICATE OF CORRECTION

PATENT NO. : 6,855,462 B2
DATED : February 15, 2005
INVENTOR(S) : Jeremy Barker, M. Yazid Saidi and Jeffrey Swoyer It is certified that error appears in the above-identified patent and that said Letters Patent is hereby corrected as shown below:

<u>Column 18,</u>
Line 19 and 21, delete "Ca," and insert -- Co -- therefor.
Line 42, delete "claims," and insert -- claim -- therefor.

Signed and Sealed this

Tenth Day of May, 2005

JON W. DUDAS
*Director of the United States Patent and Trademark Office*